United States Patent
Urbach

(10) Patent No.: US 10,988,172 B2
(45) Date of Patent: Apr. 27, 2021

(54) EXTERNAL DAMPING OF POWER STEERING FOR A VEHICLE

(71) Applicant: TRW Automotive U.S. LLC, Livonia, MI (US)

(72) Inventor: Brian A. Urbach, Livonia, MI (US)

(73) Assignee: ZF Active Safety and Electronics US LLC, Livonia, MI (US)

( * ) Notice: Subject to any disclaimer, the term of this patent is extended or adjusted under 35 U.S.C. 154(b) by 334 days.

(21) Appl. No.: 16/094,991

(22) PCT Filed: Apr. 20, 2017

(86) PCT No.: PCT/US2017/028523
§ 371 (c)(1),
(2) Date: Oct. 19, 2018

(87) PCT Pub. No.: WO2017/184815
PCT Pub. Date: Oct. 26, 2017

(65) Prior Publication Data
US 2019/0152521 A1 May 23, 2019

Related U.S. Application Data

(60) Provisional application No. 62/325,484, filed on Apr. 21, 2016.

(51) Int. Cl.
*B62D 3/08* (2006.01)
*B62D 7/22* (2006.01)
*F16F 9/16* (2006.01)
*B62D 5/04* (2006.01)

(52) U.S. Cl.
CPC ............ *B62D 7/228* (2013.01); *B62D 3/08* (2013.01); *F16F 9/16* (2013.01); *B62D 5/0448* (2013.01); *F16F 2222/06* (2013.01); *F16F 2222/08* (2013.01); *F16F 2222/12* (2013.01); *F16F 2228/066* (2013.01)

(58) Field of Classification Search
CPC ........ B62D 7/228; B62D 3/08; B62D 5/0448; F16F 9/16; F16F 2222/06; F16F 2222/08; F16F 2222/12; F16F 2228/066
See application file for complete search history.

(56) References Cited

U.S. PATENT DOCUMENTS 751,575 A * 2/1904 Veeder ................ B62D 7/22
280/90
3,853,069 A * 12/1974 Goodwin ............ B62D 1/265
180/401

(Continued)

*Primary Examiner* — Kevin Hurley
*Assistant Examiner* — Marlon A Arce
(74) *Attorney, Agent, or Firm* — Robert James Harwood

(57) ABSTRACT

A steering member has a rack portion and a screw portion. The steering member is in a steering housing and operatively connected to a tie rod. A pinion is operatively connected between the rack portion and a steering wheel. A ball nut is operatively connected to the screw portion. A power source is operatively connected to the ball nut. The power source drives the ball nut to effect linear movement of the steering member upon rotation of the steering wheel. A damper has a first connection to the tie rod and a second connection to a ground surface. The ground surface is fixed relative to the steering member. The damper is external to the ball nut.

12 Claims, 2 Drawing Sheets

(56) References Cited

U.S. PATENT DOCUMENTS

| | | | | |
|---|---|---|---|---|
| 6,530,585 B1 * | 3/2003 | Howard | ............... | B62D 6/04 |
| | | | | 280/89.11 |
| 7,055,646 B2 | 6/2006 | Bugosh | | |
| 7,207,580 B2 * | 4/2007 | Howard | ............... | B62D 6/04 |
| | | | | 280/89.11 |
| 7,874,564 B2 * | 1/2011 | Lueker, Jr. | ............ | B62D 7/228 |
| | | | | 280/89.12 |
| 8,596,659 B2 * | 12/2013 | Hudson | ............... | B62D 7/228 |
| | | | | 280/89.11 |
| 2016/0075368 A1 * | 3/2016 | Watanabe | ........... | B62D 5/0424 |
| | | | | 180/444 |

* cited by examiner

EXTERNAL DAMPING OF POWER STEERING FOR A VEHICLE

CROSS REFERENCE TO RELATED APPLICATION

This application claims priority to, and the benefit of, U.S. Provisional Application Ser. No. 62/325,484, filed Apr. 21, 2016, the full disclosure of which is incorporated herein by reference in entirety.

BACKGROUND OF INVENTION

This invention relates in general to power steering assemblies for vehicles and in particular to damping of such a power steering assembly.

An automotive vehicle typically includes a power steering assembly to assist in turning steerable wheels of the vehicle. The power steering assembly may include a rack and pinion assembly to convert rotational movement of a steering wheel of the vehicle into linear movement of a steering member. The linear movement of the steering member then turns the steerable wheels. A ball nut may be mounted on the steering member and operably connected to a power source. The power source and ball nut together assist in the linear movement of the steering member in response to rotation of the steering wheel.

Components of the power steering assembly experience internal lash, with the ball nut being a primary source of the lash. For example, the components of the power steering assembly may experience lash when a direction of steering changes from left to right or right to left. Certain frequencies of vibration from suspension components of the vehicle, or from other sources, can excite the power steering assembly into a resonance frequency because of the lash. As a result, undesirable noise, vibration, and harshness is produced by the power steering assembly.

There are known mechanical means for reducing the lash within the ball nut to reduce the resulting noise, vibration, and harshness. However, the mechanical means increase friction in the ball nut. The increased friction reduces performance of the power steering assembly. Additionally, known software control means are limited in how much lash they can reduce. Thus, it would be desirable to reduce noise, vibration, and harshness produced by the power steering assembly without increasing friction in the ball nut.

SUMMARY OF INVENTION

This invention relates to damping of a power steering assembly for a vehicle.

According to one embodiment, a power steering assembly may comprise, individually and/or in combination, one or more of the following features: A steering linkage in a steering housing, a power source effecting movement of the steering linkage, a damper, a first connection between the damper and the steering linkage, and a second connection between the damper and a ground surface. The steering linkage is moveable relative to the ground surface.

According to this embodiment, the ground surface is the steering housing.

According to this embodiment, the damper is housed in a damper housing that is incorporated into the steering housing.

According to this embodiment, the ground surface is a structural member of a vehicle in which the power steering assembly is mounted.

According to this embodiment, the first and second connections have pivot connections.

According to this embodiment, the first connection is external to the steering housing.

According to this embodiment, the damper is a hydraulic, pneumatic, combination hydraulic and pneumatic, magnetorheological, tuned mass, harmonic absorber, spring, partial electronic, or full electronic type damper.

According to this embodiment, the first connection is to a tie rod of the steering linkage.

According to this embodiment, the power source is an electric motor.

According to another embodiment, a power steering assembly may comprise, individually and/or in combination, one or more of the following features: A steering member has a rack portion and a screw portion. The steering member is in a steering housing and operatively connected to a tie rod. A pinion is operatively connected between the rack portion and a steering wheel. A ball nut is operatively connected to the screw portion. A power source is operatively connected to the ball nut. The power source drives the ball nut to effect linear movement of the steering member upon rotation of the steering wheel. A damper has a first connection to the tie rod and a second connection to a ground surface. The ground surface is fixed relative to the steering member. The damper is external to the ball nut.

According to this embodiment, the ground surface is the steering housing.

According to this embodiment, the damper is housed in a damper housing that is mounted to the steering housing and the second connection is between the damper housing and the steering housing.

According to this embodiment, the ground surface is a structural member of a vehicle in which the power steering assembly is mounted.

According to this embodiment, the damper is a hydraulic, pneumatic, combination hydraulic and pneumatic, magnetorheological, tuned mass, harmonic absorber, spring, partial electronic, or full electronic type damper.

According to another embodiment, a power steering assembly may comprise, individually and/or in combination, one or more of the following features: A steering member has a rack portion and a screw portion. The steering member is in a steering housing and operatively connected to a tie rod. A pinion is operatively connected to the rack portion. A ball nut is operatively connected to the screw portion. A power source is operatively connected to the ball nut. A damper is connected to the tie rod.

According to this embodiment, a second connection is between the damper and the steering housing and the steering housing is fixed relative to the steering member.

According to this embodiment, the damper is housed in a damper housing that is rigidly secured to the steering housing and the second connection is between the damper housing and the steering housing.

According to this embodiment, a second connection is between the damper and a structural member of a vehicle in which the power steering assembly is mounted and the structural member is fixed relative to the steering member.

According to this embodiment, the damper is a hydraulic, pneumatic, combination hydraulic and pneumatic, magnetorheological, tuned mass, harmonic absorber, spring, partial electronic, or full electronic type damper.

According to this embodiment, the damper is external to the steering member and ball nut.

One or more potential and/or realized advantages of an embodiment of the power steering assembly include a reduction of noise, vibration, and harshness produced by the power steering assembly without increasing friction in the ball nut.

DETAILED DESCRIPTION OF THE PREFERRED EMBODIMENTS

Figure 1:
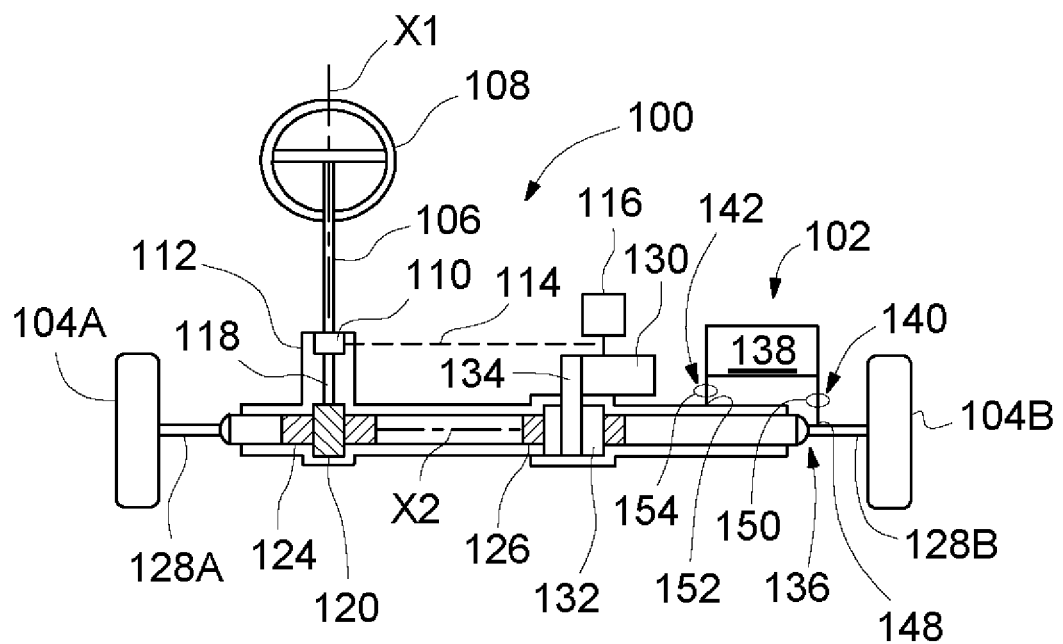
FIG. 1 is a schematic view of a power steering assembly having a first embodiment of a damper assembly in accordance with the present invention.
Figure 2:
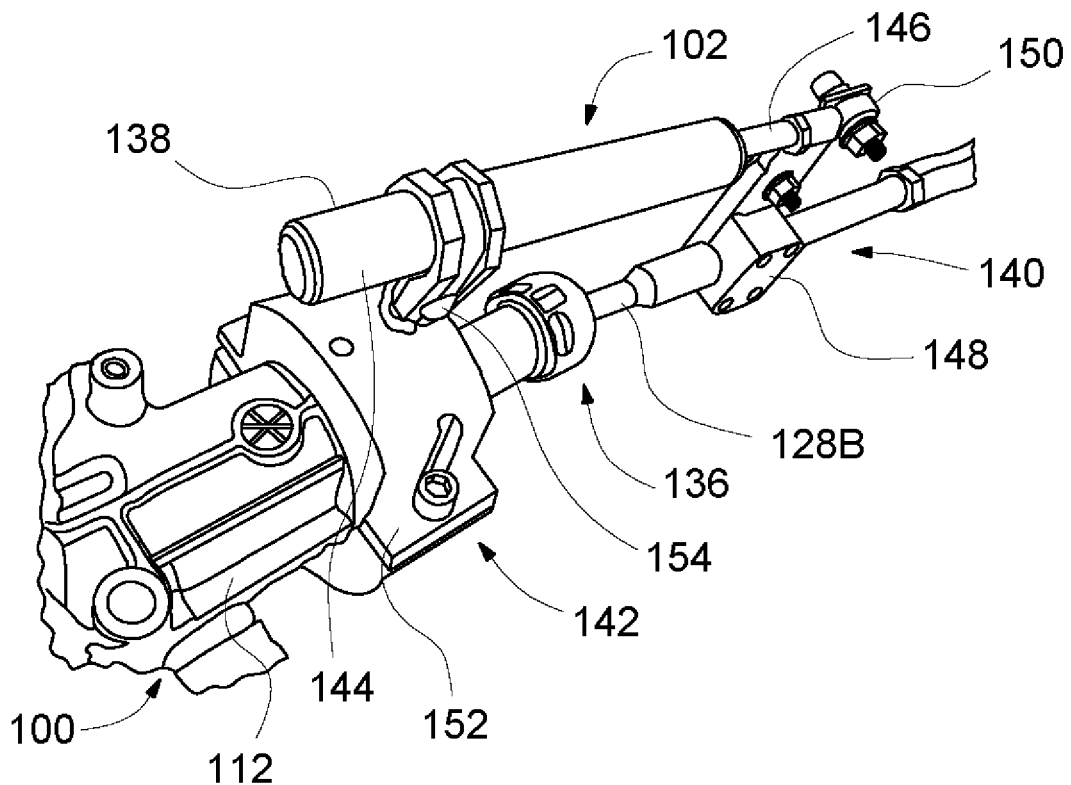
FIG. 2 is a perspective view of a damper for use with the damper assembly of FIG. 1.

Referring now to FIGS. 1 and 2, there is illustrated a power steering assembly, indicated generally at 100, for a vehicle. The power steering assembly 100 has a first embodiment of a damper assembly, indicated generally at 102, produced in accordance with the present invention. The general structure and operation of the power steering assembly 100 is conventional in the art. For example, the power steering assembly 100 may be as disclosed by U.S. Pat. No. 7,055,646 to Bugosh, the disclosure of which is hereby incorporated by reference in entirety herein. Thus, only those portions of the power steering assembly 100 which are necessary for a full understanding of this invention will be explained and illustrated in detail. Although this invention will be described and illustrated in connection with the particular power steering assembly 100 disclosed herein, it will be appreciated that this invention may be used in connection with other types of power steering assemblies, including other electric, hydraulic, or otherwise powered power steering assemblies known to those skilled in the art.

The power steering assembly 100 is associated with first and second steerable wheels 104A and 104B, respectively, of a vehicle and includes a rotatable input shaft 106. A vehicle steering wheel 108 is operatively coupled to the input shaft 106 for rotation therewith about a steering axis X1. A torque sensor 110 is located within a steering housing 112 and encircles the input shaft 106. The torque sensor 110 generates signals in response to rotation of the input shaft 106. The signals are transmitted over a data network 114 to an electronic control unit (ECU) 116. The signals indicate a direction and magnitude of steering torque applied to the steering wheel 108.

A torsion bar 118 connects the input shaft 106 to a pinion 120 located inside the steering housing 112. The torsion bar 118 twists in response to the steering torque applied to the steering wheel 108. When the torsion bar 118 twists, relative rotation occurs between the input shaft 106 and the pinion 120.

A linearly moveable steering member 122 is at least partially in, and extends axially through, the steering housing 112. The steering member 122 is linearly (or axially) moveable along a rack axis X2. A rack portion 124 of the steering member 122 is provided with a series of rack teeth which meshingly engage gear teeth provided on the pinion 120 to operatively connect the pinion 120 and rack portion 124. The steering member 122 further includes a screw portion 126 having an external screw thread convolution.

The steering member 122 is connected to the first steerable wheel 104A by a first tie rod 128A and the second steerable wheel 104B by a second tie rod 128B. The first and second tie rods 128A and 128B, respectively, are located at distal ends of the steering member 122. The steering member 122 and first and second tie rods 128A and 128B, respectively, are moveable relative to the steering housing 112. The linear movement of the steering member 122 along the rack axis X2 results in steering movement of the first and second steerable wheels 104A and 104B, respectively, in a known manner.

The power steering assembly 100 further includes a power source 130 drivably connected to a ball nut 132 housed in the steering housing 112. The power source 130 is illustrated as an electric motor, but may be other than an electric motor. For example, the power source 130 may be a hydraulic system. The ECU 116 controls the power source 130 in accordance with the signals received from the torque sensor 110. Control signals for the power source 130 are transmitted from the ECU 116 to the power source 130 via the data network 114. The power source 130 and the ball nut 132 are operatively connected by a pulley assembly 134 that includes a belt transmitting rotational power between an output of the power source 130 and the ball nut 132. Alternatively, the power source 130 may be operatively connected to the ball nut 132 by a force transmission means other than the pulley assembly 134.

The ball nut 132 is operatively connected with the screw portion 126 of the steering member 122 in a known manner. The ball nut 132 effects the linear movement of the steering member 122 upon rotation of the steering wheel 108. As discussed, the power source 130 is operated in response to rotation of the steering wheel 108 and the ball nut 132 is driven by the power source 130 via the pulley assembly 134. When the ball nut 132 is driven, the ball nut 132 rotates and, because the ball nut 132 is linearly fixed in position on the rack axis X2, the steering member 122 moves linearly. The linear movement of the steering member 122 effects steering movement of the first and second steerable wheels 104A and 104B, respectively, of the vehicle. The power source 130 thus provides steering assist in response to the applied steering torque.

In the event of the inability of the power source 130 to effect the linear movement of the steering member 122, a mechanical connection between the gear teeth on the pinion 120 and the rack teeth on the rack portion 124 of the steering member 122 permits manual steering of the vehicle. The pinion 120 and the rack portion 124 cooperate to convert rotation of the steering wheel 108 around the steering axis X1 into linear movement of the steering member 122 along the rack axis X2.

The steering member 122, first tie rod 128A, and second tie rod 128B are parts of a steering linkage, indicated generally at 136. As discussed, movement of the steering linkage 136 is effected by the power source 130 via the ball nut 132. As will be discussed, the damper assembly 102 dampens movement of the steering linkage 136. This includes the linear movement of the steering member 122 when the steering member 122 reverses direction.

The damper assembly 102 comprises a damper 138, a first connection, indicated generally at 140, and a second connection, indicated generally at 142. As such, the damper 138 is external to, and a separate component from, the steering housing 112, steering member 122, and ball nut 132. As a non-limiting example, the damper 138 may be a hydraulic type damper as illustrated in FIG. 2 and have a damper body portion 144 containing a plunger 146. The body portion 144 also contains a viscous fluid that resists—i.e., damps—movement of the plunger 146 in a manner known to those skilled in the art. For example, the viscous fluid may be rheological fluid. Properties of the viscous fluid—e.g., viscosity—may be adjusted to tune the damping provided by the damper 138 for the power steering assembly 100. The damper 138 may be tuned to eliminate or reduce specific resonance frequencies for the power steering assembly 100.

Alternatively, as non-limiting examples, the damper 138 may be a pneumatic, combination hydraulic and pneumatic, magnetorheological, tuned mass or harmonic absorber, spring, or other type of damper or damper structure. Furthermore, as additional non-limiting examples, the damper 138 may be a partial electronic type damper, in which electronics control rate plates of a hydraulic type damper, or a full electronic type damper. The full electronic type damper uses magnetic principles to control magnetic fields to reduce or eliminate undesired movement of the damper or an electro-restrictive material wherein movement of the damper compresses the electro-restrictive material and generates an electric current.

The first connection 140 is a structural member connecting the damper 138 and the steering linkage 136. For example, the first connection 140 may be a strut or rod. The first connection 140 includes a first attachment 148 and a first pivot 150. The first attachment 148 secures the first connection 140 to the second tie rod 128B. For example, the first attachment 148 may be a bolt, screw, weld, or clamp connection. The first pivot 150 allows relative rotation between the damper 138 and the second tie rod 128B. As illustrated, the first connection 140 is fully external to the steering housing 112, although such is not necessary.

As illustrated, the first attachment 148 is to the second tie rod 128B. Alternatively, the first attachment 148 may be to other than the second tie rod 128B. For example, the first attachment 148 may be to the first tie rod 128A or the steering member 122. Additionally, the damper 138 is illustrated as positioned between the steering axis X1 and the second tie rod 128B. Alternatively, the damper 138 may be positioned in other positions about the power steering assembly 110. For example, the damper 138 may be positioned between the steering axis X1 and the first tie rod 128A.

The second connection 142 is a structural member connecting the damper 138 and a ground surface—i.e., a fixed surface against which the damper 138 acts. For example, the second connection 142 may be a strut or rod. The second connection 142 includes a second attachment 152 and a second pivot 154. The second attachment 152 secures the second connection 142 to the ground surface. For example, the second attachment 152 may be a bolt, screw, weld, or clamp connection. The second pivot 154 allows relative rotation between the damper 138 and the ground surface.

As stated, the second attachment 152 is to the ground surface. The ground surface is fixed in position relative to the steering linkage 136—i.e., the steering member 122 or the first or second tie rods 128A and 128B, respectively—and the steering member 122 and first and second tie rods 128A and 128B, respectively, are moveable relative to the ground surface. As illustrated, the ground surface is the steering housing 112.

Figure 3:
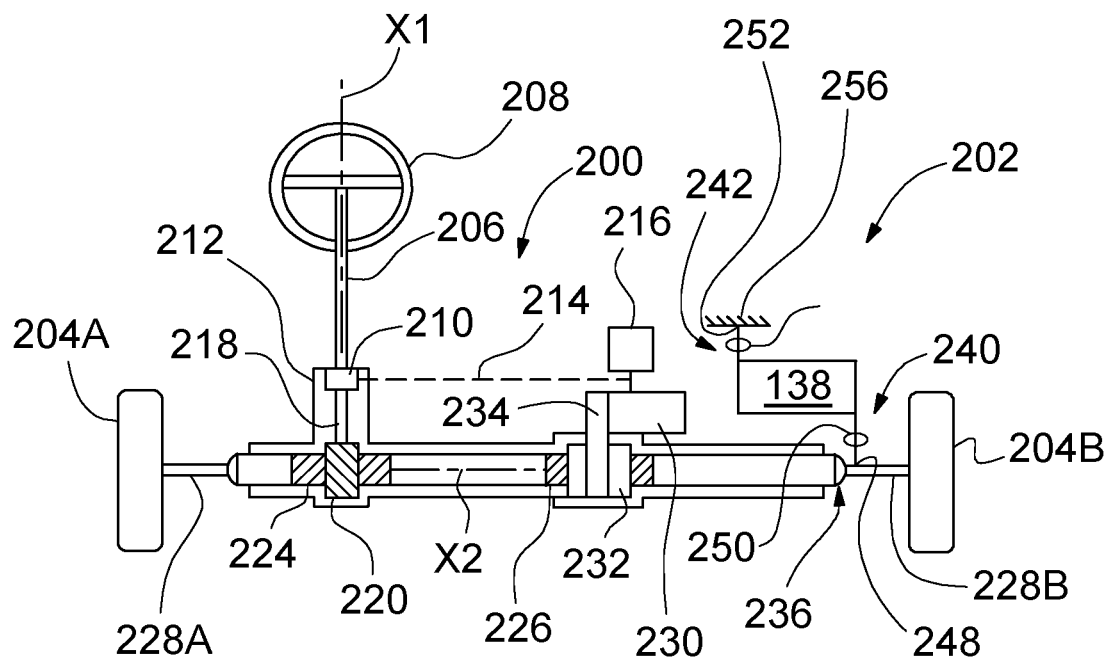
FIG. 3 is a schematic view of a power steering assembly having a second embodiment of a damper assembly in accordance with the present invention.

Referring now to FIG. 3, there is illustrated a second embodiment of a damper assembly, indicated generally at 202, produced in accordance with the present invention for use with a power steering assembly 200. Because the damper assembly 202 is a variation of the damper assembly 102 of FIGS. 1 and 2, like reference numerals, increased by 100, designate corresponding parts in the drawings and detailed description thereof will be omitted.

For the damper assembly 202, a second attachment 252 is to a ground surface 256. The ground surface 256 is a structural member of a vehicle in which the power steering assembly 200 is mounted. For example, the structural member may be a frame or body component of the vehicle. The ground surface 256 is fixed in position relative to a steering member 222 and first and second tie rods 228A and 228B, respectively, and the steering member 222 and first and second tie rods 228A and 230B, respectively, are moveable relative to the ground surface 256.

Figure 4:
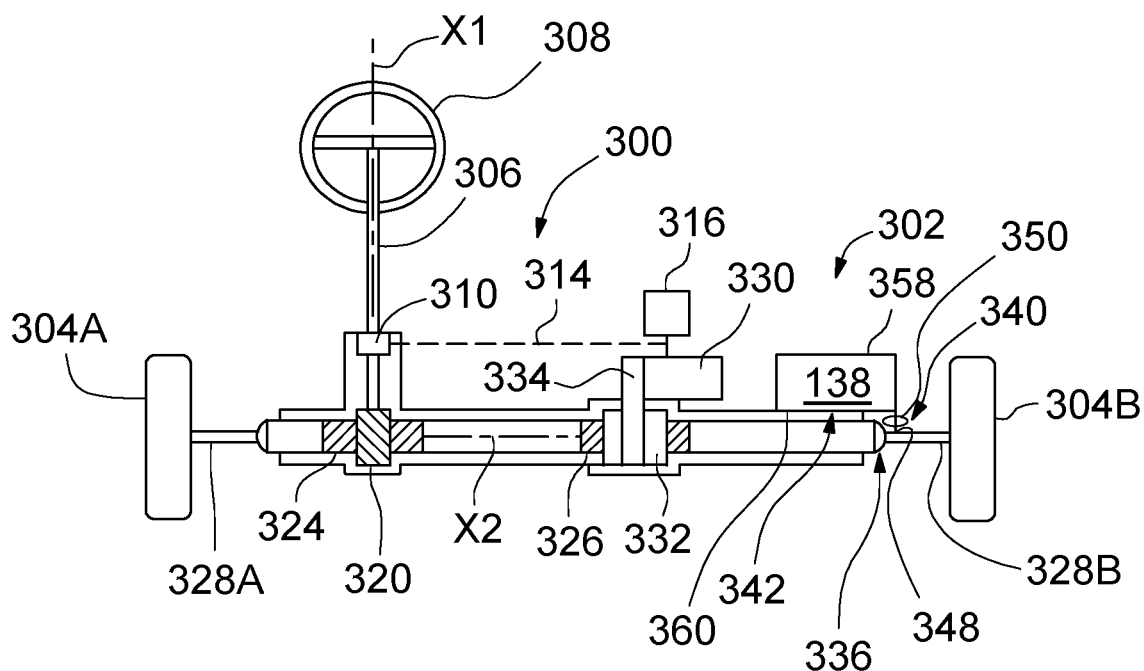
FIG. 4 is a schematic view of a power steering assembly having a third embodiment of a damper assembly in accordance with the present invention.

Referring now to FIG. 4, there is illustrated a third embodiment of a damper assembly, indicated generally at 302, produced in accordance with the present invention for use with a power steering assembly 300. Because the damper assembly 302 is a variation of the damper assembly 102 of FIGS. 1 and 2, like reference numerals, increased by 200, designate corresponding parts in the drawings and detailed description thereof will be omitted.

The damper assembly 302 includes a damper 338 housed in a damper housing 358. The damper housing 358 is mounted, attached, or otherwise directly and rigidly secured to a steering housing 312. For example, the damper housing 358 may be formed monolithically with the steering housing 312. As such, a ground surface for the damper assembly 302 is the steering housing 312 and a second connection 342 is directly between the steering housing 312 and the damper housing 358.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A power steering assembly comprising:
   a steering linkage in a steering housing;
   a power source effecting movement of the steering linkage;
   a damper;
   a first connection between the damper and the steering linkage; and
   a second connection between the damper and a ground surface comprising the steering housing, wherein the steering linkage is moveable relative to the ground surface.

2. The power steering assembly of claim 1 wherein the damper is housed in a damper housing that is incorporated into the steering housing.

3. The power steering assembly of claim 1 wherein the first and second connections have pivot connections.

4. The power steering assembly of claim 1 wherein the first connection is external to the steering housing.

5. The power steering assembly of claim 1 wherein the damper is a hydraulic, pneumatic, combination hydraulic and pneumatic, magnetorheological, tuned mass, harmonic absorber, spring, partial electronic, or full electronic type damper.

6. The power steering assembly of claim 1 wherein the first connection is to a tie rod of the steering linkage.

7. The power steering assembly of claim 1 wherein the power source is an electric motor.

8. The power steering assembly of claim 1 wherein the damper is housed in a damper housing that is rigidly secured to the steering housing and the second connection is between the damper housing and the steering housing.

9. A power steering assembly comprising:
- a steering member having a rack portion and a screw portion, wherein the steering member is in a steering housing and operatively connected to a tie rod;
- a pinion operatively connected between the rack portion and a steering wheel;
- a ball nut operatively connected to the screw portion;
- a power source operatively connected to the ball nut, wherein the power source drives the ball nut to effect linear movement of the steering member upon rotation of the steering wheel; and
- a damper having a first connection to the tie rod and a second connection to a ground surface comprising the steering housing, wherein the ground surface is fixed relative to the steering member and the damper is external to the ball nut.

10. The power steering assembly of claim 9 wherein the damper is housed in a damper housing that is mounted to the steering housing and the second connection is between the damper housing and the steering housing.

11. The power steering assembly of claim 9 wherein the damper is a hydraulic, pneumatic, combination hydraulic and pneumatic, magnetorheological, tuned mass, harmonic absorber, spring, partial electronic, or full electronic type damper.

12. A power steering assembly comprising:
- a steering linkage in a steering housing;
- a power source effecting movement of the steering linkage;
- a damper;
- a first connection between the damper and the steering linkage; and
- a second connection between the damper and a ground surface inboard of the first connection, wherein the steering linkage is moveable relative to the ground surface.

* * * * *